United States Patent [19]

Yare

[11] Patent Number: 4,477,210

[45] Date of Patent: Oct. 16, 1984

[54] CONVEYOR SYSTEM FOR LOADING SHIPS

[75] Inventor: Leslie J. Yare, Tyne & Wear, England

[73] Assignee: Northern Engineering Industries, Inc., Newcastle-upon-Tyne, England

[21] Appl. No.: 425,082

[22] PCT Filed: Jan. 29, 1982

[86] PCT No.: PCT/GB82/00026

§ 371 Date: Sep. 23, 1982

§ 102(e) Date: Sep. 23, 1982

[87] PCT Pub. No.: WO82/02702

PCT Pub. Date: Aug. 19, 1982

[30] Foreign Application Priority Data

Jan. 31, 1981 [GB] United Kingdom ............... 8103012

[51] Int. Cl.³ ............................................ B65G 53/54
[52] U.S. Cl. .................................. 406/166; 406/167;
137/615; 138/120; 414/139
[58] Field of Search ............................. 406/164–167,
406/85, 113, 115, 116, 191, 196, 195, 114;
138/120; 137/615; 285/165, 235, 302; 414/139

[56] References Cited

U.S. PATENT DOCUMENTS 594,449 11/1897 Weber ................................. 406/116
3,273,942 9/1966 McFarland ..................... 406/167 X

FOREIGN PATENT DOCUMENTS 431562 3/1925 Fed. Rep. of Germany .
1258334 1/1968 Fed. Rep. of Germany ...... 406/116
1278866 9/1968 Fed. Rep. of Germany .
1756049 8/1970 Fed. Rep. of Germany .
1404775 9/1975 United Kingdom .
2018717 10/1979 United Kingdom .

Primary Examiner—Jeffrey V. Nase
Assistant Examiner—Daniel R. Edelbrock
Attorney, Agent, or Firm—Cushman, Darby & Cushman

[57] ABSTRACT

A pneumatic conveyor system for transporting bulk materials from a shore-based hopper (2) to a ship includes a pipeline comprising an inlet section (4), an intermediate telescopic tubing (36) and an outlet section (45). One end of the telescopic tubing (36) is interconnected to the inlet section (4) by means of a universal joint (8,10), a length of flexible tubing (12) interconnecting the hopper (2) with said one end of the telescopic tubing, while the outlet section (45) is mounted on the other end of the telescopic tubing (36) by a further universal joint (48, 50), a further length of flexible tubing (52) interconnecting said other end of the telescopic tubing (36) with an outlet from the outlet section (45).

9 Claims, 4 Drawing Figures

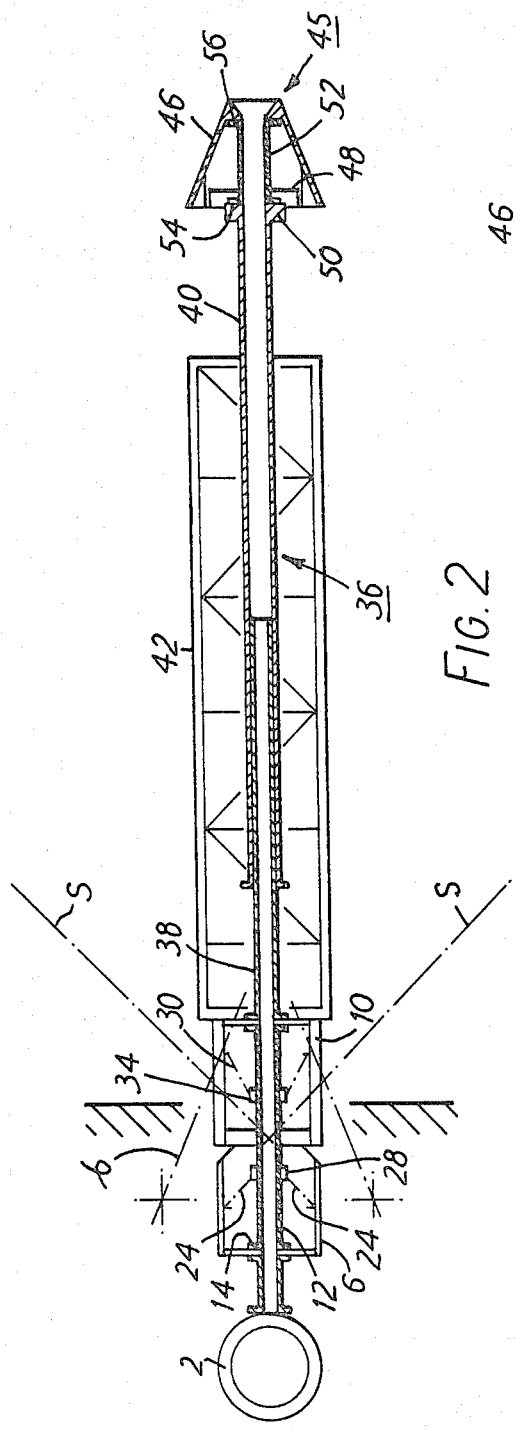
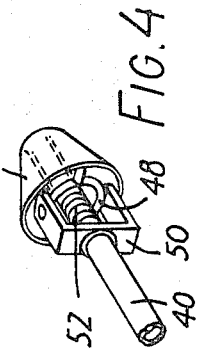
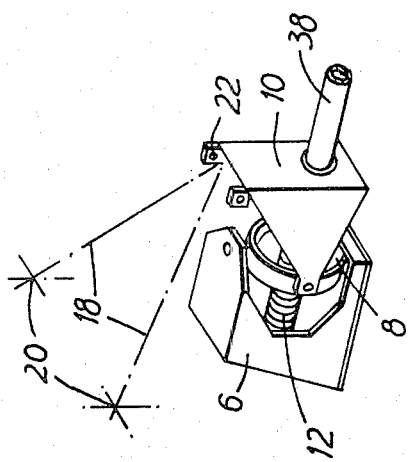

CONVEYOR SYSTEM FOR LOADING SHIPS

TECHNICAL FIELD

The present invention relates to conveyor systems for loading ships, more particularly to such systems in which bulk materials are conveyed pneumatically from shore to ship.

BACKGROUND ART

It is now established practice to convey bulk materials, such as coal, by means of pneumatic conveying equipment, the material being fed into a despatch vessel which is then supplied with compressed air, said air being utilized to transport the material from the vessel along an associated pipeline to a desired destination.

When loading ships either with hard-to-handle materials, whether they be cargo or fuel for the ship itself, such as coal to be stored in bunkers, it is currently usual to utilise mechanical means such as bucket and belt conveyors, mechanical grabs or the like.

It would be desired to be able to load ships with bulk materials by means of pneumatic conveying equipment. However, established systems of this type are incapable of accommodating the constant movement of a ship that takes place due to the influences of tide, loading ballasting and mooring drift.

DISCLOSURE OF THE INVENTION

According to the present invention there is provided a pneumatic conveyor system for transporting bulk materials from shore to ship, said system including a shore-based hopper for said material and a sealed length of pipeline extending continuously from said hopper to a receiving port in the ship, the system being characterised in that the pipeline comprises a first length of flexible tubing having an inlet end fixed relative to, for supply with material from, the hopper, and an outlet end movable universally relative to said inlet end, the outlet end of said tubing feeding into a telescopic length of rigid tubing forming an extension of said first length of flexible tubing, and a further length of flexible tubing forming a continuation of said rigid tubing, the outlet end of said further length of tubing being movable universally relative to its inlet end and being adapted for location in the receiving port of the ship.

Such a system, by virtue of the universal movability of the first and further lengths of flexible tubing at the input and output ends of the system and the ability of the intermediate telescopic section to be extended or retracted, embodies multi-planar flexibility even when rigidly connected to the ship's side, sufficient to accommodate the normal envelope of movement of the ship.

Preferably the first length of flexible tubing is incorporated in an inlet section of the pipeline, said section comprising a fixed member, the inlet end of said tubing being secured relative to said fixed member, and a movable member mounted for universal movement relative to said fixed member, the outlet end of said tubing being secured to said movable member.

Conveniently, the further length of flexible tubing is incorporated in an outlet section of the pipeline mounted on the end of the telescopic tubing remote from the inlet section of the pipeline, the inlet end of said further length of tubing being secured relative to the telescopic tubing and the outlet end of said further length of tubing being secured to, for feeding through the peak of, a truncated conical docking member universally movable relative to said end of the telescopic tubing, the port in the ship being of corresponding shape to receive said docking member therein.

The system preferably incorporates control means, conveniently hydraulic rams, for:

(a) moving the movable member of the inlet section of the pipeline, and attached telescopic tubing and outlet section, relative to the fixed member of said inlet section;

(b) extending and retracting the slidable components of the telescopic tubing relative to one another;

(c) moving the docking member relative to said end of the telescopic tubing remote from the inlet section, and (d) maintaining the first length of flexible tubing substantially rigid during pneumatic transportation of material through the pipeline.

In a preferred system, the control means are so arranged that, on pneumatic transport of material through the pipeline, the first length of flexible tubing is maintained substantially rigid and no relative movement is possible between the slidable components of the telescopic tubing.

BRIEF DESCRIPTION OF THE DRAWINGS

FIGS. 1 and 2 are part-sectional side view and plan view from above respectively of a system according to the invention, FIG. 3 shows detail of the inlet section of the pipeline of the system of FIGS. 1 and 2, and FIG. 4 shows detail of the docking member of the system of FIGS. 1 and 2.

BEST MODE OF CARRYING OUT THE INVENTION

Figure 1:
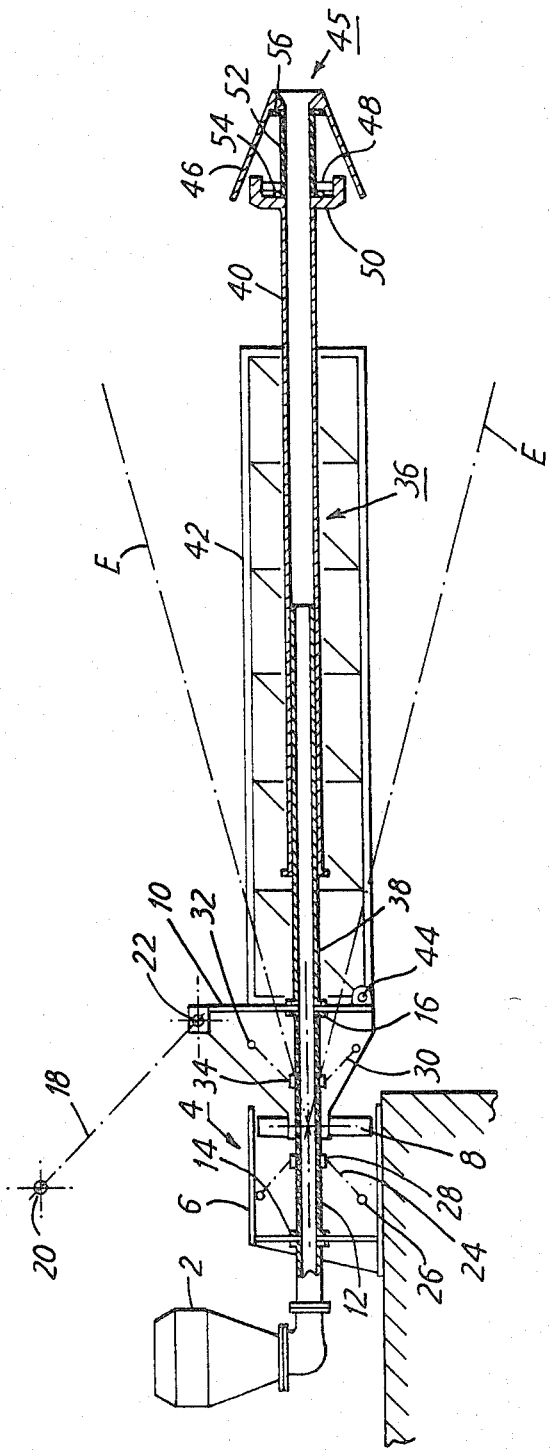

Referring to the drawings there is illustrated a pneumatic conveyor system for transporting material such as coal from a dense phase hopper 2 to a ship (not shown).

The pipeline includes an inlet section indicated generally at 4 and comprising a box-like housing 6 fixed on the wharf, said housing 6 incorporating therein a yoke 8 pivotal on a pair of diametrically-opposed trunnions about a vertical axis. The yoke 8 carries a further pair of diametrically-opposed trunnions to which is pivotally mounted a bracket 10, whereby there is provided a universal joint between the fixed housing 6 and the movable bracket 10 enabling said bracket 10 to pivot universally relative to the housing 6.

A length of flexible materials handling tubing 12 has one end 14 secured to an inlet port into the housing 6 and its other end 16 secured to an outlet port in a face of the bracket 10, the tubing 12 extending centrally through the yoke 6. Said tubing interconnects the inlet port in the housing 6 with the outlet port from the bracket 10 regardless of the position of said bracket relative to said housing.

A pair of hydraulic rams, indicated schematically at 18, extend between fixed pivot points 20 on the wharf to pivot points 22 on the upper regions of the bracket 10 whereby controlled pivoting of said bracket 10 relative to the housing 6 can be achieved.

A first set of four hydraulic rams 24 react between pivot points 26 in the fixed housing and pivot points on a band 28 surrounding the tubing 12, while a further set of four hydraulic rams 30 react between pivot points 32 on the bracket 10 and pivot points on a further band 34 surrounding the tubing 12. For any given configuration of the flexible tubing 12—i.e. for any given relative angular positions of the housing 6 and bracket 10—said rams 24 and 30 can be locked to render the tubing 12 substantially rigid for reasons which will become apparent.

A rigid length of telescopic tubing, preferably of stainless steel, is indicated generally at 36, said tubing comprising an inner extent 38 slidably mounted in, in sealing relationship with, an outer extent 40. The tubing 36 is carried in a girder—like boom structure 42 secured to the bracket 10 such that the extent 38 of the tubing 36 forms a continuation of the flexible tubing 12, there being an inflatable annular seal between the tubings 12 and 38 to ensure an airtight joint therebetween with the boom structure 42 and tubing 36 in the operative positions shown in the drawings.

The boom structure 42 is hingedly mounted to the bracket 10 at 44, a pair of hydraulic rams (not shown) reacting between the bracket 10 and the structure 42 to enable said structure 42 to be pivoted downwardly about the hinge 44 into a substantially vertical parked position.

Controlled movement of the extent 40 of the telescopic tubing 36 relative to the extent 38, to achieve extension and retraction of said tubing 36, is achieved through hydraulic winches (not shown).

Mounted on the end of the extent 40 of the telescopic tubing 36 is an outlet section 45 of the pipeline, said section comprising a hollow, truncated conical docking member 46 pivotally mounted on a pair of diametrically-opposed trunnions of a circular yoke 48. Said yoke carries a further pair of diametrically-opposed trunnions to which is pivotally mounted a bracket 50 integrally formed with the outer end of the extent 40 of the telescopic tubing. The arrangement is such as to provide a universal joint between the docking member 46 and the end of the extent 40 enabling said docking member 46 to pivot universally relative to said end of the extent 40.

A further extent of flexible materials handling tubing 52 has one end 54 secured to, to form a continuation of, the extent 40 of the telescopic tubing 36, the other end 56 of said tubing 52 being secured adjacent the hollow outlet end of the docking member 46. Said tubing 52, which extends centrally through the yoke 48, interconnects the outlet end of the telescopic tubing 36 with the outlet from the docking member 46 regardless of the angular position of the member 46 relative to the tubing 36.

The docking member incorporates hydraulic rams (not shown) for controlling the movement of said member relative to the bracket 50, as well as latching mechanisms (not shown) for retaining said member in a correspondingly-shaped receiving port in the side of a ship to be loaded.

The described conveyor system is typically used to transport coal from the hopper 2 into the bunkers of a ship at the wharf-side by dense phase techniques—i.e. by using short bursts of high pressure air to force the coal from the hopper along the pipeline.

The control rams 18 and the winches controlling the telescopic tubing 36 are initially actuated to locate the docking member 46 closely adjacent the receiving port in the side of the ship. The hydraulic rams in the docking member are then operated to manipulate the member 46 into its exact docking position and the latches are then triggered to lock the member 46 in its receiving port.

The control means are such as to enable the pipeline to be slewed, elevated and extended with sufficient precision to enable said exact location of the docking member to be achieved.

In this condition, with no material being transported through the pipeline, the system is in a free-wheel condition, the multi-planar flexibility provided by the universal joint arrangements in the inlet and outlet sections 4 and 45 together with the linear extension and retraction provided by the telescopic tubing 36 accommodating the normal envelope of movement of the ship due to the influences of tide, loading ballasting and mooring drift.

As mentioned above, transport of material along the pipeline involves the use of air under pressure and it is therefore advisable to make the full extent of the pipeline fully rigid during the blowing cycle.

Thus, just before each blowing cycle, which typically lasts only 8 to 10 seconds, the hydraulic rams 18, as well as those controlling the telescopic tubing 36, are braked to lock the associated components of the system, while the rams 24 and 30 are locked to clamp the bands 28,34 on the tubing 12, effectively to rigidify said tubing in its flexed condition. If desired, a brake may be provided on the yoke 8 and this is also locked during the blowing cycle.

Once the blowing cycle is finished, the system is switched to the free-wheel condition. Movement of the ship during the short blowing cycle is accommodated within the allowable strain loading on the complete system.

A rigid pipeline extends from the receiving port in the ship's side across the deck, said pipeline incorporating a number of diverter valves such that, under automatic signals from bunker level probes, the valves provide multiple delivery point capability across the ship's width.

As is conventional in dense phase pneumatic conveying practice, the system is totally enclosed from the hopper 2 to the ship's side connection and beyond to the ship's bunkers to prevent pollution of the surrounding environment. The bunkers are fitted with exhaust air filtration equipment to permit escape of residual conveying air, with entrainment of dust within the ship's bunker area.

In the event that the ship moves out of its normal movement envelope, the telescopic tubing 36 will extend beyond its normal operational limit into an alarm zone. A limit switch may be provided to indicate such an emergency and to close down conveying operations at the completion of its current blowing cycle.

If the ship continues to move away from the normal movement envelope such that the telescopic tubing 36 reaches the limit of its over-travel, the docking member 46 will pull out of its receiving port to disconnect the system from the ship. In such a situation it is ensured that there is no material in transit in the pipeline.

The pneumatic conveyor system according to the invention thus has three-dimensional flexibility when rigidly connected to a ship sufficient to accommodate normal movement of the ship, but can be made fully rigid during the blowing cycle to withstand the resultant forces due to material transit velocity. The pipeline can be slewed, elevated and extended to enable the docking member to be located in and locked to the receiving port in the ship. The lines E in FIG. 1 indicate the limits of upward and downward movement of the pipeline, while the lines S in FIG. 2 indicate the degree of slewing available.

When coupled to the ship'side, the conveyor has the capability of distributing the material across the whole width of the on-board bunkering facility, while the whole installation is completely enclosed and dustproof to prevent pollution.

I claim:

1. A pneumatic conveyor system for transporting bulk materials from shore to ship, said system including a shore-based hopper for said material, and a sealed pipeline extending from said hopper to a receiving port in the ship, said pipeline comprising an inlet section incorporating a fixed member, a movable member mounted for universal movement relative to said fixed member, and a first length of flexible tubing having an inlet end fixed relative to said fixed member for supply with material from the hopper and an outlet end secured to said movable member, the pipeline further comprising a telescopic length of rigid tubing forming an extension of said first length of flexible tubing, and a second length of flexible tubing forming a continuation of said telescopic tubing, the outlet end of said further length of tubing being mounted for universal movement relative to the outlet end of said rigid telescopic tubing and being adapted for location in the receiving port of the ship.

2. A pneumatic conveyor system as claimed in claim 1 in which the further length of flexible tubing is incorporated in an outlet section of the pipeline mounted on the end of the telescopic tubing remote from the inlet section of the pipeline, the inlet end of said further length of tubing being secured relative to the telescopic tubing and the outlet end of said further length of tubing being secured to, for feeding through the peak of, a truncated conical docking member universally movable relative to said end of the telescopic tubing, the port in the ship being of corresponding shape to receive said docking member therein.

3. A pneumatic conveyor system as claimed in claim 2 and including control means for moving the movable member of the inlet section of the pipeline, and attached telescopic tubing and outlet section, relative to the fixed member of said inlet section.

4. A pneumatic conveyor system as claimed in claim 2 and including control means for extending and retracting the slidable components of the telescopic tubing relative to one another.

5. A pneumatic conveyor system as claimed in claim 4 and including control means for moving the docking member relative to the end of the telescopic tubing remote from the inlet section.

6. A pneumatic conveyor system as claimed in claim 5 and including control means for maintaining the first length of flexible tubing substantially rigid.

7. A pneumatic conveyor system as claimed in claim 6 in which each control means comprises a plurality of hydraulic rams.

8. A pneumatic conveyor system as claimed in claim 7 in which the control means for maintaining the first length of flexible tubing substantially rigid comprises a first set of hydraulic rams each reacting between the fixed member of the inlet section of the pipeline and a first intermediate region of the first length of flexible tubing, and a second set of hydraulic rams each reacting between the movable member of the inlet section of the pipeline and a second intermediate region of the first length of flexible tubing.

9. A pneumatic conveyor system as claimed in claim 8 in which, on pneumatic transport of material through the pipeline, the control means for the first length of flexible tubing are actuated to maintain said tubing substantially rigid and the control means for the telescopic tubing are actuated to prevent relative movement between the slidable components of said telescopic tubing.

* * * * *